(12) United States Patent
Barton (10) Patent No.: US 7,158,531 B2
(45) Date of Patent: Jan. 2, 2007

(54) METHOD AND APPARATUS IMPLEMENTING A MULTIMEDIA DIGITAL NETWORK

(75) Inventor: James M. Barton, Alviso, CA (US)

(73) Assignee: TiVo Inc., Alviso, CA (US)

( * ) Notice: Subject to any disclaimer, the term of this patent is extended or adjusted under 35 U.S.C. 154(b) by 835 days.

(21) Appl. No.: 09/953,472

(22) Filed: Sep. 14, 2001

(65) Prior Publication Data

US 2002/0031144 A1    Mar. 14, 2002

Related U.S. Application Data (63) Continuation-in-part of application No. 09/135,753, filed on Aug. 18, 1998, now Pat. No. 6,310,886.

(60) Provisional application No. 60/057,155, filed on Aug. 28, 1997.

(51) Int. Cl.
*H04J 3/16* (2006.01)

(52) U.S. Cl. .................. 370/442; 370/468; 370/503

(58) Field of Classification Search ........ 370/230–237, 370/468, 503–510, 442–443, 401, 391, 395.4
See application file for complete search history.

(56) References Cited

U.S. PATENT DOCUMENTS

| | | | | |
|---|---|---|---|---|
| 5,533,009 A | * | 7/1996 | Chen | 370/232 |
| 5,537,549 A | * | 7/1996 | Gee et al. | 709/224 |
| 5,982,748 A | * | 11/1999 | Yin et al. | 370/232 |
| 6,041,359 A | * | 3/2000 | Birdwell | 709/238 |
| 6,097,707 A | * | 8/2000 | Hodzic et al. | 370/321 |

* cited by examiner

*Primary Examiner*—Ricky Q. Ngo
*Assistant Examiner*—Richard Chang
(74) *Attorney, Agent, or Firm*—Kirk D. Wong; Hickman Palermo Truong & Becker (57) ABSTRACT

A method and apparatus for efficiently managing the allocation of available data capacity on a physically shared digital network among devices connected to that network is disclosed. Also disclosed is a method and apparatus for managing the ongoing timely movement of data on the shared network such that precise long-term data rates are achieved between attached devices with minimal additional buffering. The invention further comprises a method and apparatus which allows the use of any remaining network capacity for non time-critical data movement without the need for centralized access management.

28 Claims, 7 Drawing Sheets

```
struct AllocationRecord {
        StreamId,                401
        StartTime,               402
        Duration,                403
        Interval,                404
        NoTransmitFlag,          405
        SignalSourceFlag,        407
        RequestRecordFlag,       408
        ClockRecordFlag,         409
        Countdown,               410
        PacketContents           406
};
```

```
set ScheduleTime = 0;
ScanAgain:
while ( ScheduleTime < WindowTime/2 )
{
   foreach AllocationRecord in AllocationRecordList
   {
      if ( Record. StartTime - ScheduleTime > New.Duration )
      {
         New.StartTime = ScheduleTime;
         Terminate foreach loop;
      }
      ScheduleTime = Record.StartTime + Record.Duration;
   }
   if no New.StartTime set
      Return Failure;

NumPasses = 1;
   TestScheduleTime = New.StartTime + New.Interval;
   while ( TestScheduleTime < WindowTime )
   {
      foreach AllocationRecord in AllocationRecordList
      {
         TestStartTime = Record.StartTime +
                  ( NumPasses * Record.Interval );
         TestEndTime = TestStartTime + Record.Duration;
         if ( ( TestScheduleTime + New.Duration < TestEndTime AND
            ( TestScheduleTime + New.Duration > TestStartTime ) )
            OR
            ( TestScheduleTime < TestEndTime AND
              TestScheduleTime >= TestStartTime ) )
         {
            goto ScanAgain;
         }
      }
      NumPasses = NumPasses + 1;
      TestScheduleTime = TestScheduleTime + New.Interval;
   }

Insert New record into AllocationRecordList;
   Return Success;
}
Return Failure;
```

Fig. 7

METHOD AND APPARATUS IMPLEMENTING A MULTIMEDIA DIGITAL NETWORK

CROSS REFERENCE TO RELATED APPLICATIONS, PRIORITY CLAIM

The present application is a continuation-in-part of application Ser. No. 09/135,753 filed Aug. 18, 1998, now U.S. Pat. No. 6,310,886, and also claims benefit of Provisional Application No. 60/057,155 filed Aug. 28, 1997.

BACKGROUND OF THE INVENTION

1. Technical Field

The invention relates to data communications networks. More particularly, the invention relates to an improved method and apparatus for managing the allocation of data capacity of a network composed of one or more physically shared network segments interconnected by packet routing devices. The invention manages the allocation of network capacity among devices attached to the various segments, where each shared network segment relies on collision avoidance and detection for managing on-demand network access within a baseband channel.

2. Description of the Prior Art

The seminal teaching for on-demand access to physically shared networks is described in R. Metcalfe, D. Boggs, C. Thacker, B. Lampson, Multipoint data communication system with collision detection, U.S. Pat. No. 4,063,220 (Dec. 13, 1977). The Metcalfe et al patent is presently referenced in 186 other patents. Examples of such networks are traditional Ethernet, IEEE Standard 802.3 for coaxial cable, and IEEE Standard 802.11 for local area wireless networking. Additionally, new technologies are being developed which provide Ethernet-like characteristics on other physical mediums, such as Category 1 or 2 unshielded twisted pairs or AC power lines.

A feature of most emerging shared-capacity technologies is that the achievable transmission rate between nodes on the network varies based on such factors as the node itself, topology of the network, and electrical noise. Such networking is often called rate-adaptive networking because each node adapts its basic transmission parameters to achieve the best rate to some other node. Unlike previous shared-capacity networks, it is not possible to describe the maximum bandwidth of the network, or to predict a priori the achievable data rate between any two nodes. This situation is becoming increasingly common with the interconnection of shared networks having different transmission speeds. For example, the family of IEEE 802 standard networks is designed for interconnection, yet the speed of each shared segment may range from a few magabits per second to gigabits per second.

As used herein, the generic term "ethernet" refers to any similar physically shared network segment. Fundamental characteristics of an ethernet are:

A number of nodes, each free to choose to transmit at any time;

An access-checking scheme, termed Carrier Sense Multiple Access (CSMA), in which a node checks if the shared network is in use before transmitting;

Collision Detection (CD), in which a node monitors the shared network as it is transmitting, to detect if another node began transmitting simultaneously, thus garbling the data; and A random back-off algorithm which attempts to de-synchronize nodes which have sent colliding packets by having each node wait a (short) random amount of time before retrying the transmission.

As used herein, the generic term "streaming media" refers to long-term, continues flows of digital information that must achieve a constant data rate measured over short periods. For example, consider a network device accepting network packets containing compressed audio data, and using that data to produce the corresponding audio signals that drive a speaker. The device has a packet buffer of some fixed size, and it is the responsibility of the sending device to insure that packets are delivered in a timely way such that the buffer never becomes empty, and that there is always room in the buffer for the next packet sent. This means that each packet in the stream must be sent at a constant interval, said interval being based on the transmission speed, buffer size, and rate at which the audio data are consumed. This interval may vary over short periods depending on the size of the receiving buffer. Larger buffers can smooth the effects of contention for the shared network as long as sufficient network bandwidth is available to sustain the long-term average delivery rate. For example, consider current streaming audio products that use the Internet for data transmission, such as Real Audio, or Windows Media Player. These work correctly as long as sufficient bandwidth and buffer capacity is available to hide any packet transmission delays in the network.

Large buffers are expensive in many ways, so it is desirable to use methods of transmitting streaming media that minimize the required receiving buffer size. For example, if the audio device described earlier is two-way, the use of large buffers results in a time-shift between the incoming and outgoing streams which is easily detectable and aurally annoying. The physical cost and implementation of large buffers can become significant for inexpensive devices, such as portable phones.

As used herein, the generic term "on-demand" refers to other digital information flows on the network. For example, data fetched by an Internet Web browser is usually formatted as packets of TCP data, but there is no time-sensitivity to how the packets actually flow through the network. Buffers for such traffic are assumed to be large and carefully managed in software. Ideally, it is desirable to mix streaming media and on-demand traffic arbitrarily on the network to achieve the most efficient use of the network bandwidth. However, the two types of traffic place conflicting requirements on the underlying network.

There have been many attempts in the past to design methods and apparatus to balance the requirements of these two types of traffic. The simplest of these networks is one in which the available network bandwidth is permanently divided between streaming media and on-demand traffic. Such networks are sometimes referred to as "isochronous" networks. A central bandwidth allocation manager schedules the bandwidth among competing devices. One flaw with such systems is that the bandwidth division is fixed, limiting both on-demand performance and the maximum streaming bandwidth that can be supported. The result is inefficient utilization of the network bandwidth and limited performance. Another limitation of such networks is that the failure of the bandwidth manager leads to failure of the entire network.

A great deal of work has gone into the creation of mixed-traffic management streams on token-ring networks. Much of this work has been codified by IEEE Standard 802.5. Physical or logical token-passing methods are used for managing access to the shared network. J. Bell, Method of Simultaneously Transmitting Isochronous and Nonisochronous Data On A Local Area Network, U.S. Pat. No. 4,587,650 (6 May 1986) discloses a general description of how this traffic management is handled on a token-ring network.

Token passing schemes have weaknesses that preclude their use in many environments. These include: a requirement that all nodes support the same bandwidth; that each node implement recovery schemes to reconstruct capacity allocations and prioritization if any node fails; and that each node provide automated network bypass in case it fails, increasing the cost of a node and lowering its reliability. Additionally, passing the tokens and data through intermediate, non-transmitting nodes adds latency and decreases capacity. Token-ring networks have fallen into technical disfavor versus ethernet networks in many applications for these reasons.

Another set of attempts to address these problems involve the use of slotted protocols, where the bandwidth of the shared media is explicitly subdivided into equal-length slots, creating a TDMA (Time-Domain Multiple Access) network. K. Crisler, M. Needham, Method for Multi-Purpose Utilization of Resource in a Communication System, U.S. Pat. No. 5,295,140 (15 Mar. 1994) and K. Sardana, Adaptive Hybrid Multiple Access Protocols, U.S. Pat. No. 5,012,469 (30 Apr. 1991) contain a good overview of these methods, which may be generally referred to as reservation protocols. In these methods, it is assumed that each node has sufficient capability to participate in a contention-based reservation protocol, resulting in long-term assignment of shared network capacity to particular nodes. A general feature of these methods is the complexity of the reservation protocol, which increases the cost to implement any given node and reduces the node's reliability. Additionally, these protocols require each node to advertise its desire for the resources of the network continuously to maintain the reservation. This is done to allow quick recovery from failed nodes, but it consumes additional network bandwidth that might be more gainfully used and increases node cost. Finally, the overall capacity of the network is lowered because it is not always possible to fill each fixed-size slot to capacity.

Other schemes have been proposed for managing bandwidth allocation which involve significant differences from the basic operation of an ethernet network. These schemes are not considered here because they involve proprietary techniques, specialized architectures, or hardware that is not commercially viable. A primary example are allocation techniques developed for Asynchronous Transfer Mode (ATM) networks, where each node has a dedicated path to a central controller.

It would be desirable to create a facility for managing any ethernet network to handle both streaming media and on-demand traffic, while achieving maximum possible efficiency and performance of the network. Many current efforts in this field center on extensions to the Internet Protocol (IP) to allow dynamic provisioning of bandwidth. These extensions, collectively named RSVP (Reservation Protocol), are designed to operate in a complex, heavily routed infrastructure where there is no a priori knowledge of the network configuration or available bandwidth, and where it is not possible to rely on a central controller. This leads to undesirable features in a simpler environment, such as a single shared network segment: large code size, slow setup and teardown of streams, and a requirement that every device support RSVP and all related protocols.

The chief flaw of RSVP in a single shared network environment is that it is a peer-to-peer protocol, and assumes intermediate routers are simply allocating and deallocating bandwidth within their backplane and at the network ports, such that notions of total available bandwidth and managed reservations are disallowed. In an environment where the devices share a physical network and the bandwidth between any two devices is arbitrary, the lack of such knowledge leads to conflicts between devices. This is a key issue, one as yet unresolved by any standard protocol specification.

It would be desirable to provide a method and apparatus that addresses the weaknesses of prior art in this field (as described above) within any interconnected set of ethernet networks where there is varying physical bandwidth between nodes on the network.

SUMMARY OF THE INVENTION

The method and apparatus described herein address the problems of bandwidth allocation on a shared digital network, using a unique, novel, and simple mechanism for scheduling streaming media and on-demand transmissions so that efficient use of the network is achieved while maintaining stable data delivery rates.

One embodiment of the invention provides a simple means by which any device can present a sequenced stream of packets to a network for transmission and have those packets sent at precisely specified times. This function is implemented with minimal additional hardware in each network node, thereby reducing or eliminating added cost.

Another embodiment of the invention allows nodes to transmit on-demand packets on the network without disrupting the ongoing flow of streaming data, and without requiring the intervention of any centralized controller or the use of a token-passing or TDMA reservation scheme.

Another embodiment of the invention provides for maximal efficiency in the transmission of on-demand data by allowing nodes to contend for access to the shared network during times when the network is available for on-demand data. At the same time, any conflict that might arise if all nodes were not able to send their packets during one of those periods is avoided.

DETAILED DESCRIPTION OF THE INVENTION

This invention relates generally to an improved method and apparatus for managing the allocation of data capacity on a network composed of one or more interconnected, physically shared network segments, where a node's access to a shared segment is managed using collision avoidance and detection techniques within a baseband channel.

Figure 1:
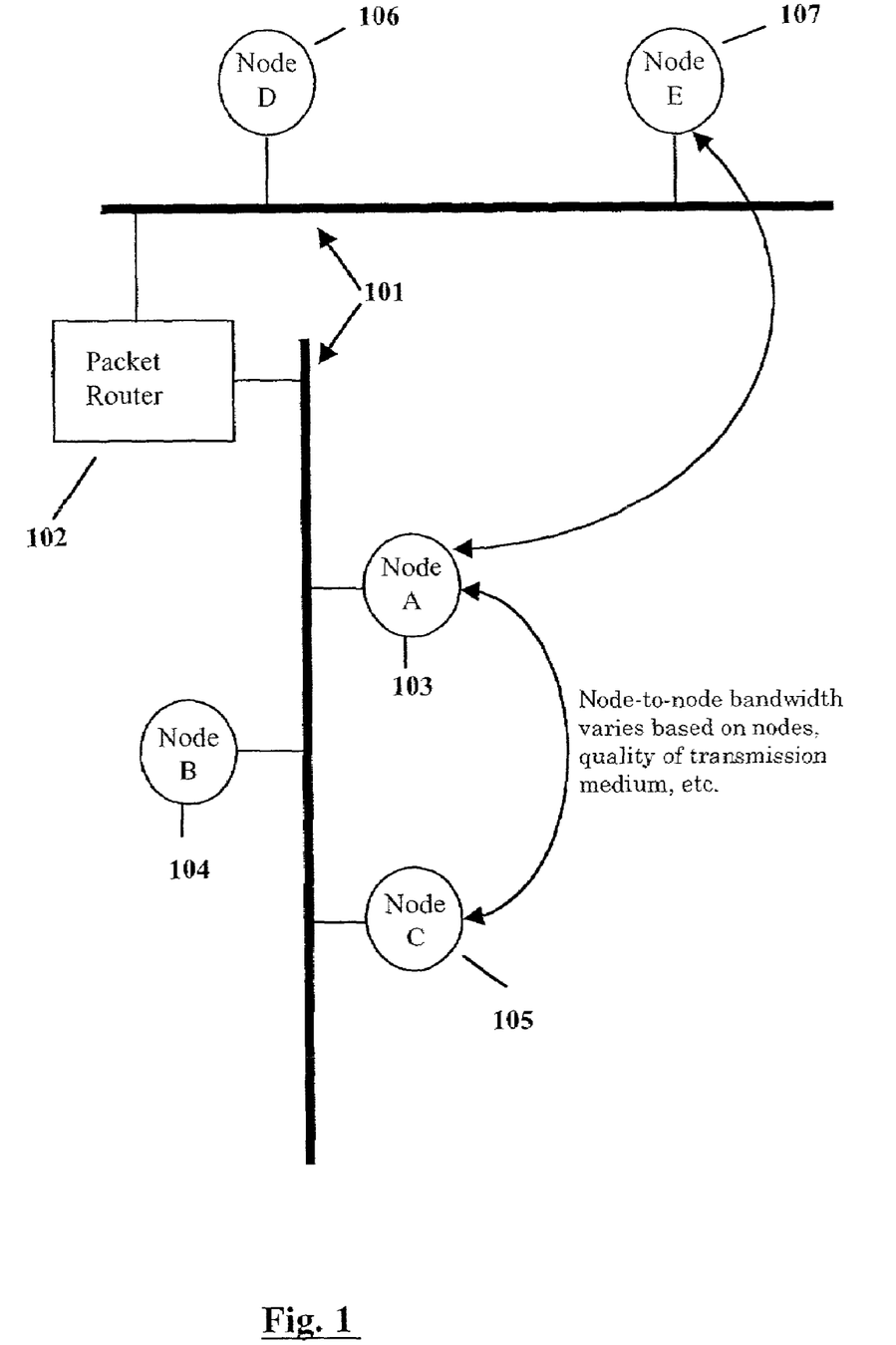
FIG. 1 is a block schematic diagram showing a general model of a rate-adaptive broadcast packet network in which transmission rate and signal quality may vary between nodes.

FIG. 1 is a block schematic diagram showing a general model of a an interconnected network of physically shared network segments. One or more of the shared segments may be a rate-adaptive broadcast packet network in which transmission rate and signal quality may vary, such as a radio or phone-line based network. Some of the shared segments may have predictable bandwidth between nodes, but the shared segments may have different capacities. The method and apparatus of this invention concern the enhancements, modifications, and methods required to implement a streaming media service which operates in parallel with on-demand packet-based services on an interconnected network of ethernet segments 101 which may include a packet routing device 102 (such as a hub, router, switch or bridge), while providing reliable, glitch-free delivery of the streaming media between various network nodes 103–107, and while maximizing the efficient use of the physical transmission medium.

The only requirement of a device routing packets 102 between shared segments is that it properly relay broadcast packets between the networks, a property of almost all common routing devices.

Figure 2:
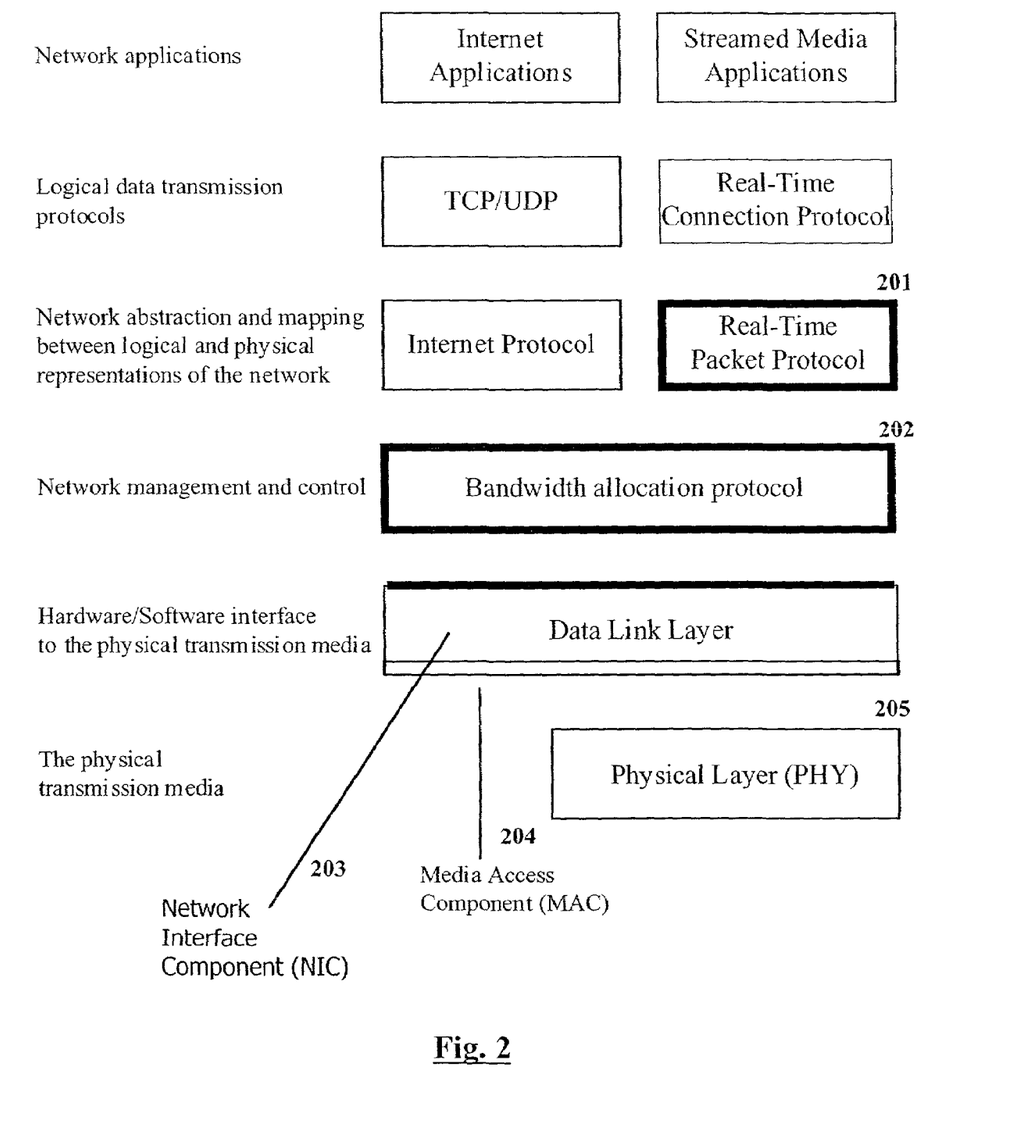
FIG. 2 is a block schematic diagram showing an abstract working model on which the herein described method and apparatus are used according to the invention.

FIG. 2 is a block schematic diagram showing a typical abstract networking model within which the method and apparatus are used according to the invention. In FIG. 2, bold lines indicate specific areas addressed by the disclosed methods and apparatus, i.e. real-time packet protocol 201, a bandwidth allocation protocol 202, and a Network Interface Component (NIC) 203 which is responsible for controlling packet transmission on the network.

The method and apparatus described herein:

Significantly reduce the required complexity and cost of each network node over existing techniques;

Correctly manage an interconnected set of physically shared digital network segments where the bandwidth between any two nodes may vary, perhaps greatly, from the bandwidth achievable between any other pair of nodes;

Replace the notion of a slotted allocation scheme with one which provides for arbitrary choice of packet size and transmission times;

Eliminate the need for a reservation protocol for on-demand packet transmissions;

Provide fault tolerance features which allow the continued correct operation of remaining nodes attached to the network in the face of one or more node failures; and Provide fault-recovery features that allow the transparent addition of new or repaired nodes to the shared network without disturbing ongoing streaming media transmissions.

This description is broken into four separate parts:

1. Modifications to common Network Interface Component (NIC) hardware which provide control over how and when packets are transmitted on the network.
2. A distributed method of managing media access among nodes on the network while allowing contention for unallocated bandwidth.
3. A distributed method for scheduling bandwidth allocations among competing nodes that provides for long-term continuous streaming of packets.
4. Methods for recovering from node failures and initializing new nodes for proper operation, with no interference to ongoing streaming allocations.

Network Interface Component (NIC) Hardware Modifications

Standard practice NIC hardware combines three functions:

1. Physical Layer (PHY) 205, which handles the actual media and which varies depending on the media type. This application contemplates no new or unique methods or techniques in regards to physical network media.
2. Media Access Control (MAC) 204, which is responsible for obtaining control of the network transmission medium, and properly framing and transmitting a packet of data on that medium. The methods of this application apply to networks using the Carrier Sense Multiple Access with Collision Detection (CSMA/CD) protocol and similar protocols that form the standard for contention-based broadcast (i.e. ethernet) networks. This invention contemplates no new or unique methods or techniques in regards to media access control.
3. Sequencing and control, which concerns, for example, retrying transmission if the carrier is busy or conflicts occur; moving packets between local buffers and host memory as required; and interacting with the host to handle control operations properly, such as interrupts, or starting and stopping the NIC. In general, the host provides packets for transmission along with certain control flags and other data that modify how the NIC processes a packet. The methods and apparatus of this invention apply to this group of functions 203.

Figure 3:
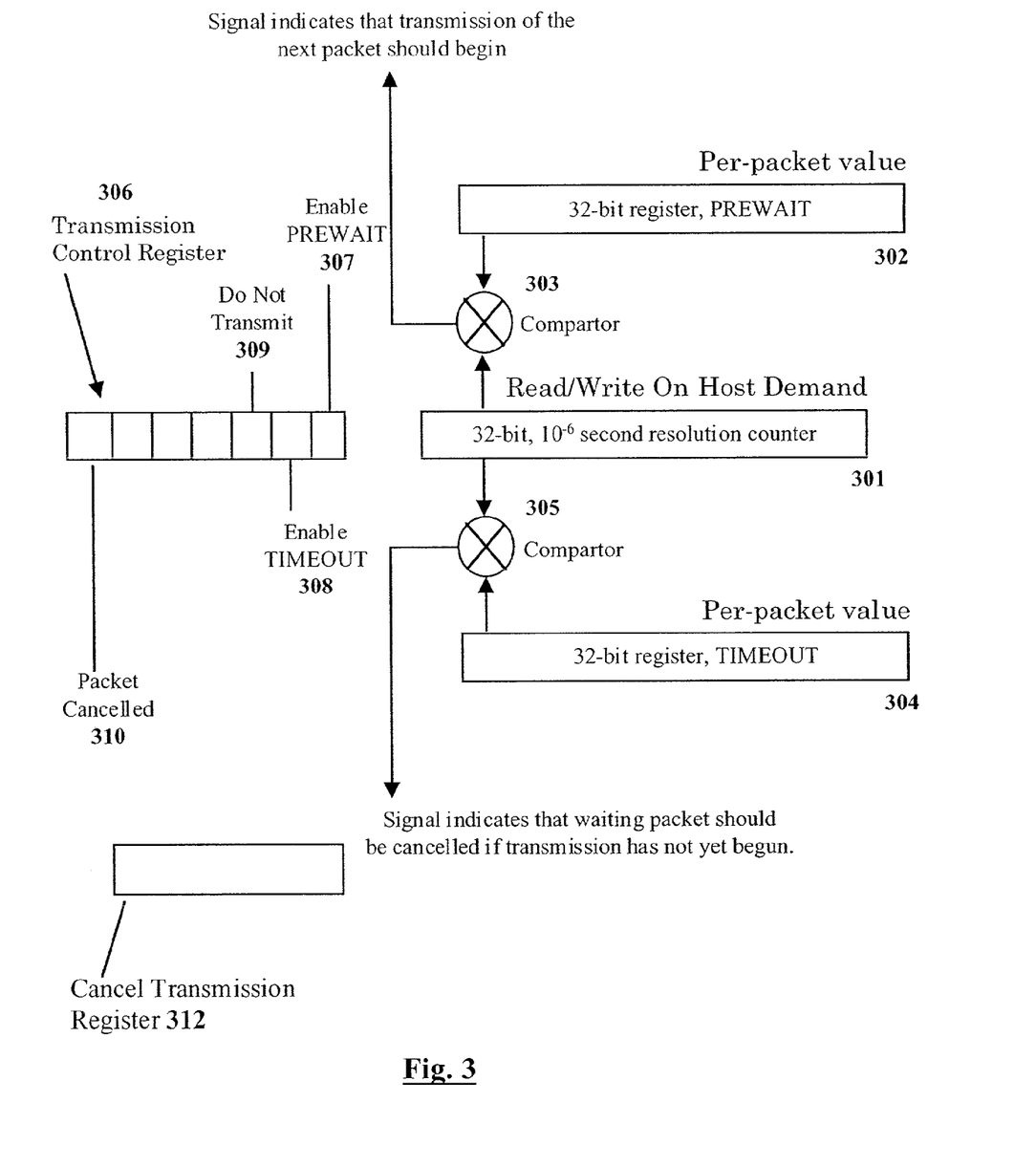
FIG. 3 is a block schematic diagram showing enhancement to a software driver interface for a normal NIC according to the invention.

FIG. 3 is a block schematic diagram showing enhancements to the packet transmission interface for a normal NIC according to the invention. In particular, FIG. 3 gives a pictorial overview of the additional NIC apparatus supporting the invention. These are the key elements of this apparatus:

1. A free-running counter 301 with at least microsecond resolution, and a suitably long period. This counter may be read or modified by software at any time.
2. A register 302 called "PREWAIT" with the same size as the counter 301, the register and counter being interconnected with a comparator 303 which signals the NIC to transmit a queued packet when the register and counter are equal.
3. A register 304 called "TIMEOUT" with the same size as the counter 301, the register and counter being interconnected with a comparator 305 which signals the NIC to cease attempting to send a packet if the NIC has delayed transmission due to a collision or while waiting for some other transmission to complete.
4. A control register 306 which modifies the behavior of the NIC and reports status of the current packet transmission.
5. A control register 312, which, when set to any value, signals the NIC to cancel a pending transmission unless it has actually begun transmission of the packet through the MAC and PHY layers.

When the control software initiates transmission of a packet, the following additional steps are taken once the packet is ready:

1. If the NIC is to wait some number of clocks before initiating the transmission, the PREWAIT register 302 is loaded with the appropriate value.
2. If the NIC is to cancel an attempted transmission after some number of clocks have passed, the TIMEOUT register 304 is loaded with the appropriate value.
3. The control register 306 is set to the appropriate value, which automatically causes the NIC to begin transmission of the packet according to the bit settings of the register.

The bit settings in the control register 306 modify the NIC behavior as follows:
1. If the Enable PREWAIT bit 307 is set, it enables the comparator 303 and causes the NIC to wait until the comparator signals before beginning transmission.
2. If the Enable TIMEOUT bit 308 is set, it enables the comparator 305. The comparator will signal the NIC to cease attempting transmission when a match occurs.
3. If the Do Not Transmit bit 309 is set and the Enable PREWAIT bit 307 is set, the NIC will wait until the comparator 303 signals, set the Packet Canceled bit 310 in the control register, and wait for the next request.

Managing Media Access and Packet Transmission

Figure 4:
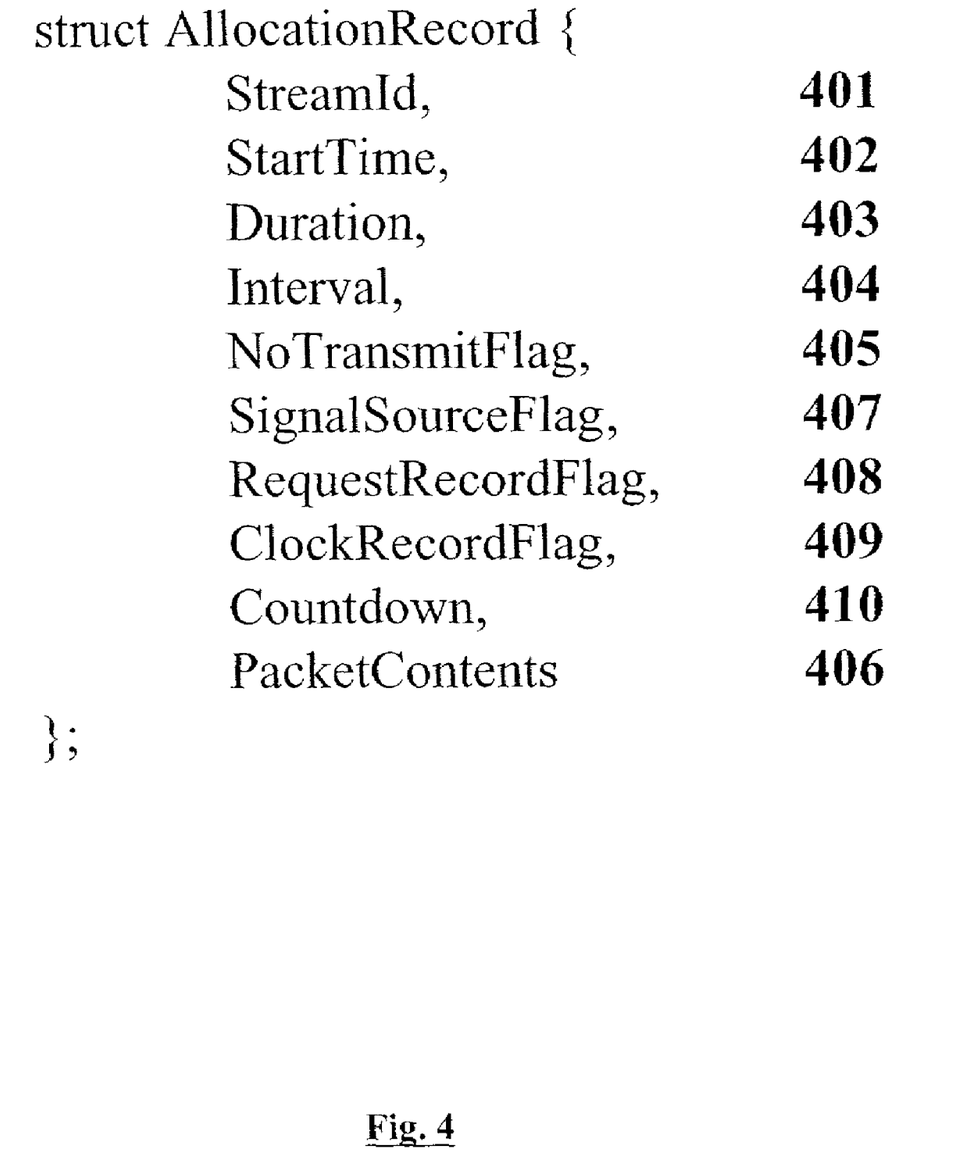
FIG. 4 shows the structure of an allocation record describing a reservation of a portion of network bandwidth.

The control software manages the queuing and transmission of packets on the network using two separate queues: a list of allocation records referring to continuous streams, and a queue of on-demand packets awaiting transmission. The list of allocation records specifies times at which the NIC will be attempting to send stream packets; otherwise, the queue of on-demand packets is serviced. Referring to FIG. 4, each allocation record has at least 6 elements:
1. The stream id 401, which is a network-wide unique identifier for the stream associated with this record.
2. The start time 402, which is a clock value relative to the NIC counter 301, which indicates when the packet associated with this allocation record should begin transmission on the network. This value would typically be loaded into the PREWAIT register 302 by software when it becomes time to transmit the packet.
3. The transmission time of the packet 403, which indicates the number of counter 301 clocks it takes to transmit the packet to the destination node plus a number of padding clocks to cover packet overhead and transmission delay. This number is typically computed when setting up the stream, and does not vary over time (i.e., the packet size is fixed).
4. The packet interval 404 of the stream, which indicates the time between packet transmissions for this stream using the same clock unit as the counter 301.
5. The suppress transmission flag 405, which, when set, indicates that the Do Not Transmit bit 309 should be set in the transmission control register when setting up the NIC for this allocation record.
6. The packet contents 406, which may be a pointer to the packet data, or simply be the packet data itself in a typical ring-buffer memory.

Figure 5:
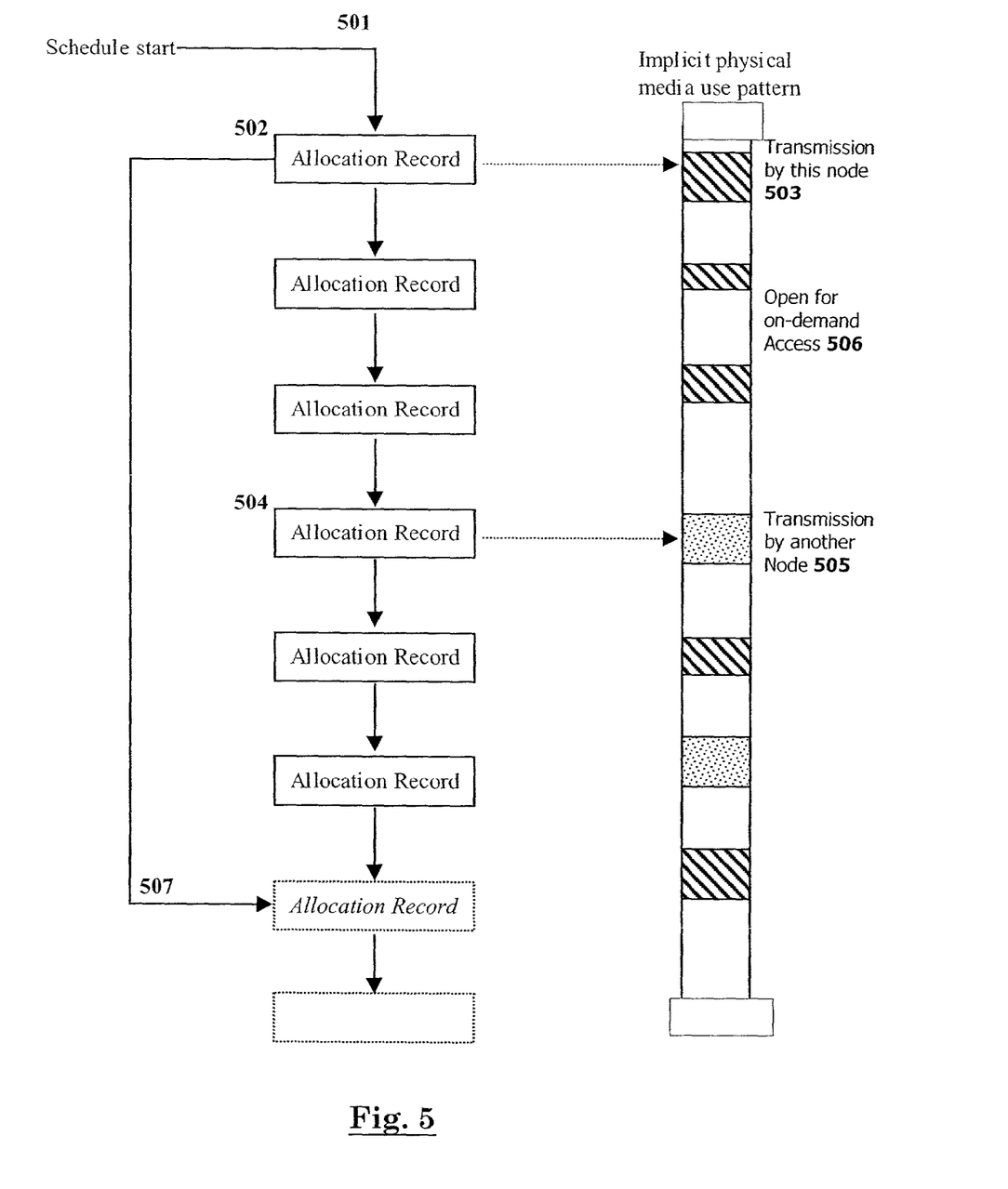
FIG. 5 is a flow diagram showing how schedule data structure maintained in each node describes active streams, bandwidth allocation, and candidate slot for non-stream transmissions according to the invention.

FIG. 5 depicts a representative list of allocation records 501. An example allocation record 502 defines a window of time 503 on the network, according to the values in the allocation record as described above. The allocation records are listed in order according to their start times, and the start time plus duration of any allocation record can not overlap the start time of the next record.

The example allocation record 504 has the suppress transmission flag set. This indicates that this window of network time is reserved for some other node to transmit a packet 505 (possibly to the current node). The window of time is defined by the allocation record as above.

Windows of network time such as 506 occur between the start time plus duration of one record and the start time of the next record. During this time, on-demand packets may be sent.

The list of allocation records is processed as follows:
1. If no on-demand packets are queued, the start time of the first allocation record is used to set the PREWAIT register 302, the packet is made available to the NIC, and the control register 306 is initialized.
2. If the allocation record indicated that no packet was to be sent (a reserved window), the PREWAIT register is instead loaded with the sum of the start time and the transmission duration, and the control register initialized.
3. Once the NIC completes the request, the allocation record is re-inserted into the list 507, using the current start time 402 plus the packet interval 404 as the new start time. Since the data associated with this new transmission window is not present, the transmission is automatically suppressed by setting the do not transmit bit 309. It is the responsibility of the software supplying packets for this continuous stream to provide the next packet in sequence before this record reaches the head of the list. Even if the packet is not supplied, the behavior of the node is stable and robust: an empty window of time passes on the network and no other node is affected.

If on-demand packets are also present, the difference between the current counter value 301 and the start time of the first allocation record, less the numbers of clocks required to send the on-demand packet, is added to the counter value and set in the TIMEOUT register 304. The packet is presented to the NIC, and the control register set with the Enable TIMEOUT bit 308 set. Either the NIC will successfully transmit the packet, and the packet will be removed from the queue, or the TIMEOUT signal will occur, and the packet will be left in the queue for the next attempt.

Whenever the window is smaller than the time to send the on-demand packet, the packet is left in the queue and instead the first allocation record is processed as described above.

Finally, an allocation record may be active in the NIC, awaiting the PREWAIT time, when an on-demand packet becomes available for transmission. The difference between the current clock 301 and the start time 402 is calculated, and if this difference is greater than the time needed to send the on-demand packet to its destination, the transmission is cancelled by setting the cancel register 312. The on-demand packet is then presented to the NIC as described above with the appropriate TIMEOUT setting.

This method of managing packet transmission achieves the goals of the invention. It is not dependent on the bandwidth of the network (which may be incalculable) or any shared segment thereof, and allows for efficient switching of the network between streaming and contention-based access without central control. It requires that the source node knows the bandwidth at which a packet can be sent to the destination node. This bandwidth is easily determined in a number of different ways. For example, upon first transmission of a packet to a node, a timed exchange of a fixed-size probe packet with the destination node would allow direct calculation of the bandwidth. Alternatively, a node-to-node bandwidth table might be made available to the software by some external means, even through manual entry.

Because this method is distributed among all nodes on the network, and the schedule followed in parallel, it is scalable to any size network and any number of nodes, unlike the typical centralized management methods described earlier. Instead, the overhead of managing the schedule scales relative to the maximum bandwidth available between any two nodes on the network.

A second requirement of the invention is the proper synchronization of the counters 301 in each node. Achieving and maintaining this synchronization is intertwined with fault recovery on the network, and is discussed in detail below.

Finally, this mechanism has been described within the context of a unicast stream (one sender, one receiver). The methods described here work equally well for multicast streams (one sender, multiple receivers), especially as each node has an explicit copy of the distributed schedule, and all streams are uniquely identified. A limitation of multi-cast streaming according to the invention is the number of receivers that can be supported is limited, as described in the context of fault recovery below.

Building the Schedule of Network Transmissions

Figure 6:
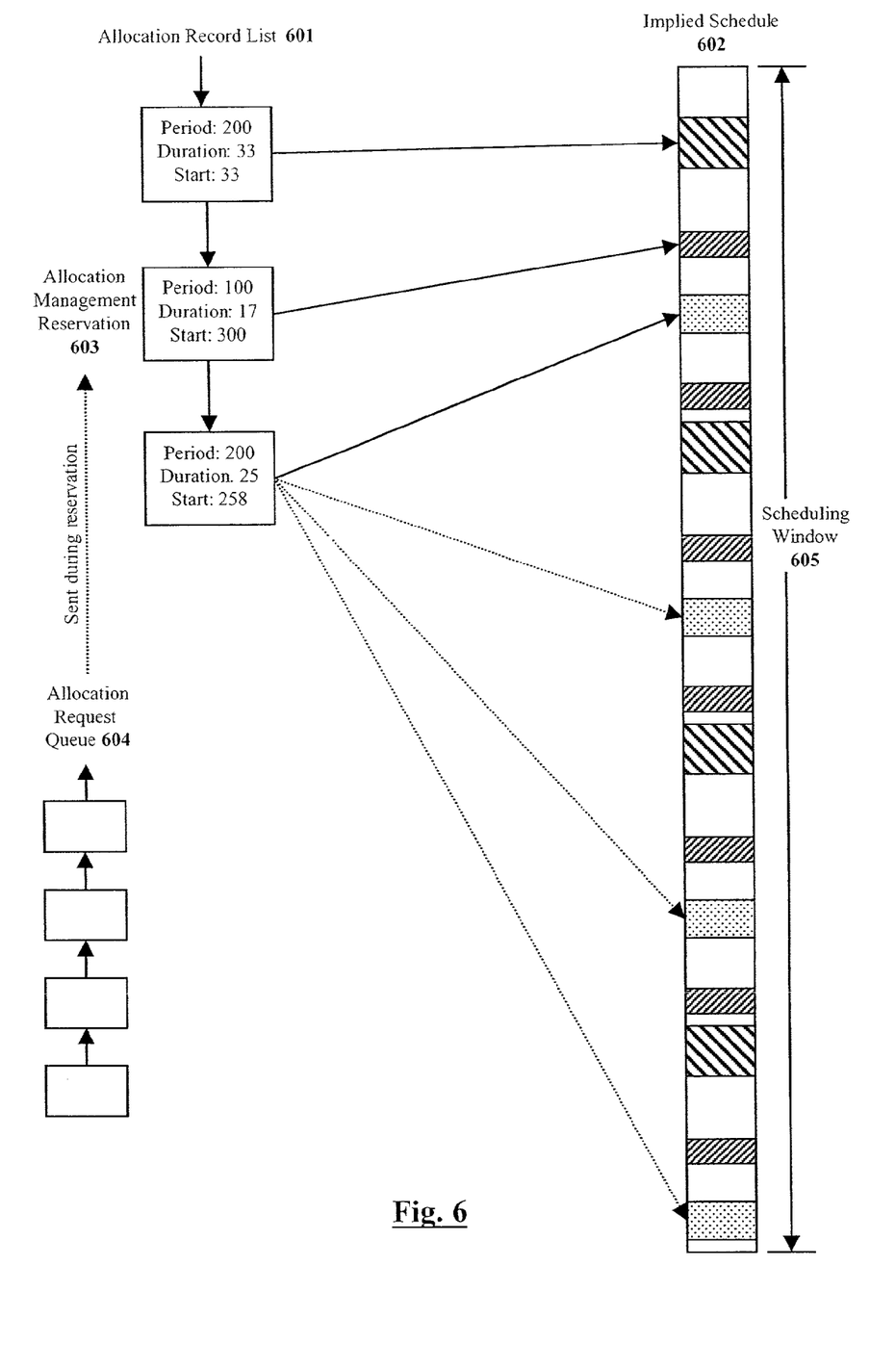
FIG. 6 is a block schematic diagram showing additional detail in the context of scheduling an allocation of bandwidth on the network according to the invention.

Referring to FIG. 6, the list of allocation records 601 is properly viewed as a schedule of network transmissions 602. Allocation records are set up and torn down on all nodes in parallel through a broadcast from the requesting node. A portion of the network schedule is reserved for managing allocation records 603. This reservation is sized for a broadcast bandwidth suitable to reach every device on the network, i.e. it is sized for the device with the lowest available bandwidth. The reserved bandwidth allocation record is specially marked 408, as well as having transmission disabled 405. If a node wishes to allocate bandwidth, the request is queued separately 604, and when the reserved allocation record is processed, the node attempts to send packets in this queue using normal on-demand, contention-based transmission. In parallel, the node may receive packets from other nodes for bandwidth allocation operations, which are performed as described below.

When a node receives an allocation message, it performs the proper operation on its local copy of the schedule. The allocation request may have originated with the node itself (recall that collision detection requires the node to listen to its own transmissions) or some other node. This means that the schedule will only be modified if the request is properly received, providing assurance that all schedules in the network will be updated together. If the node is not sending the stream of data, it allocates a dead-space record 504; otherwise, a normal record 502 is allocated and the node deletes the separately queued allocation request.

The allocation request may exactly match a previous allocation request, including stream id, start time, duration and interval. If so, the request is discarded; the proper allocation record is already in place in this list. This behavior is important for fault recovery and discovery, as described below. There is one special case for such a request; it may include a flag indicating that this is a tear-down request, which causes the matching allocation record to be deleted from the schedule. Typically, the sending node for the stream will issue this request when no more data is available.

Determining the proper window for a continuous stream is somewhat complex, since each stream may have a different period, window size and start time. It is necessary to insure that the duration and period of the new stream fit within the implied windows created by the current schedule 602 (the start time of the new stream will vary depending on the available windows). It is the responsibility of the node requesting the allocation to properly schedule a new request, using its local copy of the allocation list.

Figure 7:
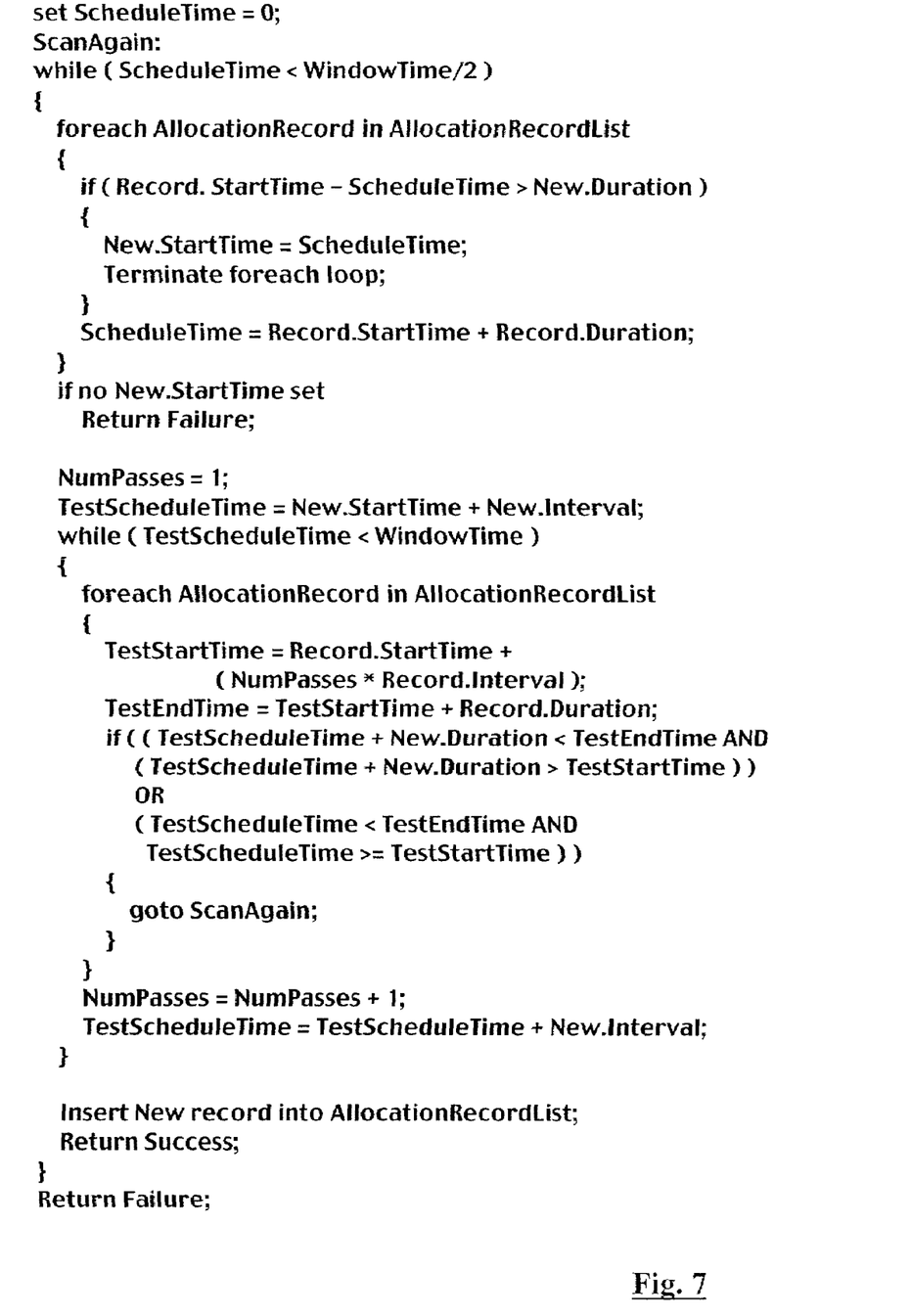
FIG. 7 shows an exemplary algorithm that is used to perform the scheduling of bandwidth allocations according to the invention.

A scheduling window 605 is chosen such that it is at least double the maximum allowed packet interval 404 for any continuous stream. In most instances, this window will be no more than a few seconds long, since longer periods imply greater buffering and longer packets which are disadvantageous. The allocation record list is continually scanned, wherein on each repeated scan the start time of each record is computed as the previous start time plus the period. This scanning ceases when a start time exceeds the scheduling window. During the scan, a candidate start time for the new allocation is chosen when an unallocated portion of bandwidth is recognized which is sufficient in size for the duration of a transmission for the new stream. The scan continues, also increasing the start time of the new allocation on each repeat, until either 1) the start time plus duration of the new allocation overlaps an existing allocation, or 2) the scheduling window is exceeded. In the latter case, an allocation request is created for the new stream and added to the local request queue 604 using the chosen start time. Otherwise, the entire scan is repeated from the previous candidate start time plus the size of the overlap which caused the scan to be repeated. If the candidate start time is advanced past one-half the scheduling window, there is no bandwidth available to satisfy the request. FIG. 7 gives an algorithmic description of this simple scheduling process.

If an allocation request arrives from another node during the scheduling process, the node will abandon the scheduling effort and start over once the local copy of the allocation list is updated. The allocation request queue is also emptied, and each allocation request is re-scheduled and queued. These actions are necessary since the requests may have been invalidated by the change in allocations.

Discovery and Fault Recovery

Network configurations are seldom static, and it is expected that nodes come and go over time for various reasons, such as node failure or power failure. Discovery and initialization of new devices, and cleanup from device failure are the two areas of interest in this domain. Failures of the transmission media (such as accidentally cutting a wire carrying network transmissions) must be resolved externally to the system described here. The following unique and novel methods are described which handle these issues.

One node on the network is designated the "clock" node. Periodically, it broadcasts an on-demand packet containing the current value of the NIC counter 301 and the unique network address of the clock node. Upon receipt of this packet, all other nodes read the local counter 301 and compute the difference in values. If they are not the same, two actions are taken. First, the allocation record list is scanned, and the start time of each record is adjusted by this difference. Second, the counter, and if the NIC is active, the PREWAIT register 302 and the TIMEOUT register 304 are similarly adjusted. This strategy eliminates the effects of clock drift in the NIC over time, as well as providing for recovery if the clock node fails, as described below. When a device is first connected to the network, it awaits broadcast of the network clock, using it to set the local NIC counter. The node also records the unique network address of the clock node for later reference.

The first node to initialize on the network and the remaining nodes after failure of a clock node will not receive the periodic clock update. After waiting a specific amount of time, one or more nodes will broadcast a clock update as described above. The first clock update a node receives sets the clock source; subsequent updates that originate from a different node are ignored. The node receiving its own clock update takes responsibility for broadcasting the network clock. Even in the absence of the clock update, the allocation record list is processed as normal. Normal streaming operations will continue without interference until a new node establishes itself as the clock node.

During the life of the stream, the receiving node is responsible for broadcasting allocation records for the stream indicating continued interest in receiving the stream, these records being identical to the original setup record, as modified by synchronizing clock packets from the clock node. These broadcasts are called "continued interest" allocation records, and are sent after each stream packet is received. All nodes on the network use these continued interest broadcasts to set an internal count-down field kept in the matching allocation record 410 to a preferred value. Each time the allocation record is processed by a node this field is decremented. If the field goes to zero, the node assumes that the sender or receiver has failed or become inaccessible, and deletes the allocation record from the allocation record list. The sender will cease sending stream packets when this occurs.

A new node entering the network synchronizes with the current network state very simply: it awaits the clock packet and adds allocation records to its local allocation record list as they are received. The node is forbidden from transmitting until it first receives the clock packet, followed by a time period equivalent to twice the required continued interest broadcast interval. This assures that the node has a current copy of the allocation record list before it starts transmitting on the network.

Support for multi-cast streaming is automatic within the methods described here. Each receiving node broadcasts the continued-interest message as described. The drawback of this approach is that as the number of multi-cast stream receivers increases, the network load of continued-interest messages increases as well, linearly with the number of receivers. Each redundant continued-interest request must be processed by all nodes, and will properly reset the count-down field in the matching allocation records 410. An alternative approach when the number of receivers is very high is for one or more nodes to behave as described in the invention, and for the remaining receiving nodes to "shadow" these nodes, meaning that they will not send continued-interest requests. If all primary receiving nodes fail, than all shadow nodes would also lose service, since the sender will cease transmitting stream packets.

Detection of node failure when a node is solely sending or receiving on-demand packets is not dealt with at this level. It is assumed that higher-level software properly detects and recovers from attempts to communicate with failed nodes.

AN ALTERNATIVE EMBODIMENT OF THE INVENTION

With respect to the interface between the Network Interface Component (NIC) and software, there is an alternative embodiment of the invention that avoids requiring any changes to the NIC. It assumes that the NIC can be operated in a direct mode, i.e. that commands may be explicitly given to the NIC to transmit a packet or cancel a packet. Thus, the typical ring-buffer structure which allows semi-autonomous operation by the NIC is bypassed. Nearly all NIC interfaces support such operation for diagnostic or real-time control purposes, of which the alternative embodiment is an example.

A ring-buffer structure is typically used to provide a level of decoupling between NIC operation and host processing, which increases performance by allowing parallel operation of the NIC and the host, and reduces host load by requiring less processing for each packet sent or received. In many instances, especially for lower-cost devices which are dedicated to particular tasks, employing a ring-buffer structure has no advantage over direct management of packet transmission by a separate controller. This leads to the alternative embodiment.

The trade-off versus the preferred embodiment is that such direct management of the NIC necessarily increases the overhead costs in host software drivers, and reduces the accuracy for scheduling transmissions by the time taken for such overhead. Additional loss of accuracy occurs during interrupt handling, where actual dispatching of the software interrupt routines is delayed due to other active tasks.

In the context of the transmission schedule, such overhead reduces the scheduling resolution which can be achieved. For example, a NIC enhanced with the preferred embodiment has a resolution equivalent to that of the continuous counter in the preferred embodiment. To guarantee correct operation of all devices, the effective resolution of the counter must be reduced to that of the slowest responding device on the network.

As an example, consider a shared network using a basic clock resolution of one microsecond. The slowest controller on the network implements the software method described below, where interrupt latency is <=10 us. To assure proper operation, each node schedules packets assuming a 1 us counter, but all values are rounded up to the nearest 10 us. This technique is referred to as padding the schedule. The drawback of padding is that it causes additional idle time on the network because the network may be unused during these times, lowering overall efficiency.

In the context of the invention described here, a low-resolution clock causes the network to behave similarly to a TDMA (time-division, multiple-access) network, with the advantage over existing TDMA scheduling techniques of providing a distributed packet transmission and scheduling system. The cost of a low-resolution clock is as expected for a TDMA network: loss of network efficiency and throughput.

A software driver is assumed which has access to a high-precision clock which can be used to trigger an interrupt.

As in the preferred embodiment, the schedule for the shared network is followed by this driver. Algorithmically, the driver does as follows:

```
NIC_Transmit_Interrupt() {
    Mark current packet done, reschedule if appropriate;
    Fetch next packet in schedule;
    if (packet is not to be transmitted) {
        calculate clock offset to packet timeout value;
        set timer to interrupt controller at (now + offset);
        return;
    }
    if (packet is streaming data) {
        calculate clock offset to packet transmit time;
        set timer to interrupt controller at (now + offset);
        return;
    }
```

-continued

```
        /* must be an on-demand packet */
        if (timeout for contention) {
              calculate clock offset to packet timeout value;
              set timer to interrupt controller at (now + offset);
        }
        instruct NIC to transmit packet;
}
Timer_Interrupt_SendNow {
        /* called for streaming data packet */
        instruct NIC to transmit packet;
}
Timer_Interrupt_Timeout {
        /* called for timeouts */
        cancel NIC packet transmission, if active;
        call NIC_Transmit_Interrupt to simulate NIC completion;
}
```

As an example, consider a software driver installed within a desktop operating system, such as Windows 95. Timer interrupt accuracy is 10 milliseconds, implying that there are 100 slots available. On a 10 Mbit/sec segment of the network, it is possible to send approximately 10 Kbytes of data every 10 milliseconds. If a packet is only 1 Kbyte in length, then 90% of the capacity of a slot is wasted. An example might be a simple audio playback device that has only a 1 Kbyte buffer to minimize cost, and requires 50 Kbyte/sec of data for uninterrupted playback. This implies 50 of the available 100 slots are only 10% filled, and thus network efficiency overall has been reduced by 45%.

This explains why the apparatus described in the preferred embodiment is unique and novel. If a counter with 1 us resolution is used, then the same 1 Kbyte transmission takes 820 us (less then 1 us/byte), and the next packet can be transmitted immediately afterwards. In the 10 millisecond example above, the network would be idle for 10180 us before the next transmission.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method for managing the allocation of the data capacity of a streaming media service across interconnected networks, said method comprising the steps of:
   avoiding network contention across said interconnected networks using a distributed bandwidth reservation schedule;
   wherein said interconnected networks contain nodes with differing connection speeds;
   receiving and maintaining a copy of said reservation schedule on each node;
   wherein said reservation schedule is synchronized across all nodes by a periodic network clock broadcast;
   calculating bandwidth between a source node and a destination node;
   reserving bandwidth for a stream in said reservation schedule on said source node based on said bandwidth calculation step; and
   wherein said destination node is responsible for broadcasting continued interest allocation records after each stream packet is received indicating continued interest in receiving said stream.

2. The method of claim 1, wherein said reservation schedule works in parallel with an on-demand packet-based service on said nodes.

3. The method of claim 1, wherein a list of allocation records on said nodes represents allocated bandwidth in said reservation schedule, and wherein each allocation record defines a window of network time.

4. The method of claim 3, further comprising the step of:
   providing a queue of on-demand packets on each node; and
   wherein on-demand packets are sent when a required time to send an on-demand packet exists in between allocation records.

5. The method of claim 1, wherein a portion of said reservation schedule is reserved for managing allocation records.

6. The method of claim 1, wherein a node broadcasts a bandwidth allocation request to all nodes in said interconnected networks.

7. The method of claim 6, wherein a node deletes said reserved bandwidth if said continued interest allocation records are not received within a predetermined period of time.

8. The method of claim 7, wherein if said source node deletes said reserved bandwidth then said source node ceases sending said stream to said destination node.

9. The method of claim 6, wherein a receiving node reserves bandwidth in its copy of said reservation schedule upon receipt of a valid allocation request.

10. The method of claim 6, wherein if a received allocation request matches a previous allocation request, then a receiving node discards said received allocation request.

11. The method of claim 6, wherein if a received allocation request is a tear-down request, then a receiving node deletes the matching allocation record from its copy of said reservation schedule.

12. The method of claim 6, wherein if an allocation request arrives from another node while a receiving node is creating its own allocation request, the receiving node will abandon its allocation request effort and start over after it updates its copy of said reservation schedule.

13. The method of claim 1, wherein one node in said interconnected networks is designated a clock node and sends a periodic network clock broadcast to all nodes in said interconnected networks.

14. The method of claim 13, further comprising the step of:
   selecting a new clock node upon failure of said clock node.

15. An apparatus for managing the allocation of the data capacity of a streaming media service across interconnected networks, comprising:
   a distributed bandwidth reservation schedule for avoiding network contention across said interconnected networks;
   wherein said interconnected networks contain nodes with differing connection speeds;
   reservation schedule maintenance means resident on each node for receiving and maintaining a copy of said reservation schedule;
   wherein said reservation schedule is synchronized across all nodes by a periodic network clock broadcast;
   bandwidth calculation means for calculating the bandwidth between a source node and a destination node;

bandwidth reservation means resident on said source node for reserving bandwidth for a stream in said reservation schedule based on said bandwidth calculation means; and wherein said destination node is responsible for broadcasting continued interest allocation records after each stream packet is received indicating continued interest in receiving said stream.

16. The apparatus of claim 15, further comprising:
an on-demand packet-based service on said nodes; and
wherein said reservation schedule works in parallel with said on-demand packet-based service.

17. The apparatus of claim 15, further comprising:
a list of allocation records on each node;
wherein said list of allocation records represents allocated bandwidth in said reservation schedule; and
wherein each allocation record defines a window of network time.

18. The apparatus of claim 17, further comprising:
a queue of on-demand packets on each node; and
wherein on-demand packets are sent when a required time to send an on-demand packet exists in between allocation records.

19. The apparatus of claim 17, wherein a portion of said reservation schedule is reserved for managing allocation records.

20. The apparatus of claim 15, wherein a node broadcasts a bandwidth allocation request to all nodes in said interconnected networks.

21. The apparatus of claim 20, wherein a node deletes said reserved bandwidth if said continued interest allocation records are not received within a predetermined period of time.

22. The apparatus of claim 21, wherein if said source node deletes said reserved bandwidth then said source node ceases sending said stream to said destination node.

23. The apparatus of claim 20, wherein a receiving node reserves bandwidth in its copy of said reservation schedule upon receipt of a valid allocation request.

24. The apparatus of claim 20, wherein if a received allocation request matches a previous allocation request, then a receiving node discards said received allocation request.

25. The apparatus of claim 20, wherein if a received allocation request is a tear-down request, then a receiving node deletes the matching allocation record from its copy of said reservation schedule.

26. The apparatus of claim 20, wherein if an allocation request arrives from another node while the receiving node is creating its own allocation request, a receiving node will abandon its allocation request effort and start over after it updates its copy of said reservation schedule.

27. The apparatus of claim 15, wherein one node in said interconnected networks is designated a clock node and sends a periodic network clock broadcast to all nodes in said interconnected networks.

28. The apparatus of claim 27, further comprising:
means for selecting a new clock node upon failure of said clock node.

* * * * *

UNITED STATES PATENT AND TRADEMARK OFFICE
CERTIFICATE OF CORRECTION

| | | |
|---|---|---|
| PATENT NO. | : 7,158,531 B2 | Page 1 of 1 |
| APPLICATION NO. | : 09/953472 | |
| DATED | : January 2, 2007 | |
| INVENTOR(S) | : James M. Barton | |

It is certified that error appears in the above-identified patent and that said Letters Patent is hereby corrected as shown below:

Column 14, line 14, delete "claim 1" and insert therefor --claim 3--

Signed and Sealed this

Seventeenth Day of March, 2009

JOHN DOLL
*Acting Director of the United States Patent and Trademark Office*